(12) United States Patent
Balasubramanian et al.

(10) Patent No.: US 12,505,103 B2
(45) Date of Patent: Dec. 23, 2025

(54) SYSTEM FOR INTELLIGENT AND INTEGRATED PRESERVATION OF MULTIPLE ELECTRONIC DATA RECORDS WITHIN A DISTRIBUTED ELECTRONIC DATA REGISTER

(71) Applicant: BANK OF AMERICA CORPORATION, Charlotte, NC (US)

(72) Inventors: Saravanan Balasubramanian, Tamil Nadu (IN); Shouryan Sharma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/018,771

(22) Filed: Jan. 13, 2025

(65) Prior Publication Data

US 2025/0147965 A1 May 8, 2025

Related U.S. Application Data

(63) Continuation of application No. 18/383,632, filed on Oct. 25, 2023, now Pat. No. 12,248,475.

(51) Int. Cl.
*G06F 16/2455* (2019.01)
*G06F 16/2457* (2019.01)

(52) U.S. Cl.
CPC ...... *G06F 16/2455* (2019.01); *G06F 16/2457* (2019.01)

(58) Field of Classification Search
CPC .................. G06F 16/2455; G06F 16/2457
See application file for complete search history.

(56) References Cited

U.S. PATENT DOCUMENTS

| | | |
|---|---|---|
| 8,190,528 B2 | 5/2012 | Ginter et al. |
| 8,316,237 B1 | 11/2012 | Felsher et al. |
| 8,498,941 B2 | 7/2013 | Felsher |
| 8,583,263 B2 | 11/2013 | Hoffberg et al. |
| 8,600,895 B2 | 12/2013 | Felsher |
| 9,143,839 B2 | 9/2015 | Reisman |
| 9,734,169 B2 | 8/2017 | Redlich et al. |
| 10,231,077 B2 | 3/2019 | Raduchel et al. |
| 10,572,684 B2 | 2/2020 | Lafever et al. |

(Continued)

*Primary Examiner* — Apu M Mofiz
*Assistant Examiner* — Oscar Wehovz
(74) *Attorney, Agent, or Firm* — Moore & Van Allen PLLC; Nicholas C. Russell

(57) ABSTRACT

A system is provided for preservation of multiple electronic data records within a distributed electronic data register. The system may use a stacked data structure within the distributed electronic data register that allows data records or blocks within the distributed electronic data register to include multiple links or pointers (e.g., hash values) to previous blocks, where previous blocks are linked to a single parent block. By using such a multi-link data structure, the system may prevent the waste of energy and/or computing resources associated with the computational work of the nodes for submitting blocks to be appended to the distributed electronic data register. The system may further use a two-pointer algorithm for traversing the multi-link distributed electronic data register, thereby providing for an efficient way to search for specific data records. The system thus provides a secure and efficient way to store data within a distributed electronic data register.

20 Claims, 9 Drawing Sheets

(56) References Cited

U.S. PATENT DOCUMENTS

| | | |
|---|---|---|
| 10,691,715 B2 | 6/2020 | Wesley, Sr. et al. |
| 10,839,020 B2 | 11/2020 | Shah |
| 11,399,063 B2 | 7/2022 | Narayanaswamy et al. |
| 11,550,514 B2 | 1/2023 | Karr et al. |
| 11,822,807 B2 | 11/2023 | Hankins et al. |
| 11,853,191 B2 | 12/2023 | Degaonkar et al. |
| 2016/0164884 A1* | 6/2016 | Sriram .................. H04L 9/3247 |
| | | 705/51 |
| 2018/0176318 A1 | 6/2018 | Rathod |
| 2019/0339687 A1 | 11/2019 | Cella et al. |
| 2020/0174463 A1 | 6/2020 | Cella et al. |
| 2021/0182190 A1 | 6/2021 | Gao et al. |
| 2022/0050921 A1 | 2/2022 | Lafever et al. |
| 2022/0083046 A1 | 3/2022 | Cella et al. |
| 2023/0085807 A1* | 3/2023 | Dai ........................... H04L 9/50 |
| | | 713/189 |
| 2023/0115293 A1 | 4/2023 | Karr et al. |
| 2024/0163121 A1* | 5/2024 | Huang .................... G06F 16/27 |

\* cited by examiner

SYSTEM FOR INTELLIGENT AND INTEGRATED PRESERVATION OF MULTIPLE ELECTRONIC DATA RECORDS WITHIN A DISTRIBUTED ELECTRONIC DATA REGISTER

CROSS-REFERENCE TO RELATED APPLICATION

The present application is a continuation application of and claims the benefit of priority to U.S. patent application Ser. No. 18/383,632 filed on Oct. 25, 2023 and of the same title; the contents of which are incorporated herein by reference.

TECHNOLOGICAL FIELD

Example embodiments of the present disclosure relate to a system and method for intelligent and integrated preservation of multiple electronic data records within a distributed electronic data register.

BACKGROUND

There is a need for a secure and efficient way to preserve generated data records within a distributed data register.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for intelligent and integrated preservation of multiple electronic data records within a distributed electronic data register. In particular, the system may use a stacked data structure within the distributed register that allows data records or blocks within the distributed register to include multiple links or pointers (e.g., hash values) to previous blocks, where such previous blocks may be linked to a single parent block. By using such a multi-link data structure, the system may prevent the waste of energy and/or computing resources associated with the computational work of the nodes for submitting blocks to be appended to the distributed register. In addition, the system may use a two-pointer algorithm for traversing the multi-link distributed register, thereby providing for an efficient way to search for specific data records. In this way, the system provides a more secure and efficient way to store data within a distributed register.

Accordingly, embodiments of the present disclosure provide a system for intelligent and integrated preservation of multiple electronic data records within a distributed electronic data register, the system comprising a processing device; a non-transitory storage device containing instructions when executed by the processing device, causes the processing device to perform the steps of receiving, from a first distributed register node, a first valid block to be appended to a distributed register; receiving, from a second distributed register node, a second valid block to be appended to the distributed register; appending both the first valid block and the second valid block to a parent block in the distributed register, where both the first valid block and the second valid block comprise a hash of the parent block; receiving a subsequent block after the first valid block and the second valid block have been appended to the parent block; and appending the subsequent block to the distributed register as a stacked block, wherein the stacked block comprises a hash stack, wherein the hash stack comprises a hash of the first valid block and a hash of the second valid block.

In some embodiments, the instructions, when executed by the processing device, further causes the processing device to perform the steps of receiving a query for a data record within the distributed register; and executing a search function of the distributed register using a two pointer algorithm.

In some embodiments, executing the search function comprises traversing the distributed register two blocks at a time with a first pointer beginning with a first hash within the hash stack, and traversing the distributed register one block at a time with a second pointer beginning with a second hash within the hash stack; based on locating a genesis block of the distributed register using the first pointer, reversing a direction of the first pointer and traversing the distributed register one block at a time with the first pointer; locating the parent block within the distributed register based on identifying a convergence of the first pointer and the second pointer; and executing a linear search on each of one or more paths within the hash stack, wherein each linear search terminates at the parent block.

In some embodiments, the hash stack further comprises a hash of a third valid block.

In some embodiments, the third valid block is appended to a fourth valid block, wherein the fourth valid block is appended to the parent block.

In some embodiments, the first valid block comprises a first set of block data, wherein the second valid block comprises a second set of block data.

In some embodiments, the distributed register is based on a proof-of-work consensus algorithm, wherein the first valid block and the second valid block each comprise a valid solution to a cryptographic challenge as defined by the proof-of-work consensus algorithm.

Embodiments of the present disclosure also provide a computer program product for intelligent and integrated preservation of multiple electronic data records within a distributed electronic data register, the computer program product comprising a non-transitory computer-readable medium comprising code causing an apparatus to perform the steps of receiving, from a first distributed register node, a first valid block to be appended to a distributed register; receiving, from a second distributed register node, a second valid block to be appended to the distributed register; appending both the first valid block and the second valid block to a parent block in the distributed register, where both the first valid block and the second valid block comprise a hash of the parent block; receiving a subsequent block after the first valid block and the second valid block have been appended to the parent block; and appending the subsequent block to the distributed register as a stacked block, wherein the stacked block comprises a hash stack, wherein the hash stack comprises a hash of the first valid block and a hash of the second valid block.

In some embodiments, the code further causes the apparatus to perform the steps of receiving a query for a data record within the distributed register; and executing a search function of the distributed register using a two pointer algorithm.

In some embodiments, executing the search function comprises traversing the distributed register two blocks at a time with a first pointer beginning with a first hash within the hash stack, and traversing the distributed register one block at a time with a second pointer beginning with a second hash within the hash stack; based on locating a genesis block of the distributed register using the first pointer, reversing a direction of the first pointer and traversing the distributed register one block at a time with the first pointer; locating the parent block within the distributed register based on identifying a convergence of the first pointer and the second pointer; and executing a linear search on each of one or more paths within the hash stack, wherein each linear search terminates at the parent block.

In some embodiments, the hash stack further comprises a hash of a third valid block.

In some embodiments, the third valid block is appended to a fourth valid block, wherein the fourth valid block is appended to the parent block.

In some embodiments, the first valid block comprises a first set of block data, wherein the second valid block comprises a second set of block data.

Embodiments of the present disclosure also provide a computer-implemented method for intelligent and integrated preservation of multiple electronic data records within a distributed electronic data register, the computer-implemented method comprising receiving, from a first distributed register node, a first valid block to be appended to a distributed register; receiving, from a second distributed register node, a second valid block to be appended to the distributed register; appending both the first valid block and the second valid block to a parent block in the distributed register, where both the first valid block and the second valid block comprise a hash of the parent block; receiving a subsequent block after the first valid block and the second valid block have been appended to the parent block; and appending the subsequent block to the distributed register as a stacked block, wherein the stacked block comprises a hash stack, wherein the hash stack comprises a hash of the first valid block and a hash of the second valid block.

In some embodiments, the computer-implemented method further comprises receiving a query for a data record within the distributed register; and executing a search function of the distributed register using a two pointer algorithm.

In some embodiments, executing the search function comprises traversing the distributed register two blocks at a time with a first pointer beginning with a first hash within the hash stack, and traversing the distributed register one block at a time with a second pointer beginning with a second hash within the hash stack; based on locating a genesis block of the distributed register using the first pointer, reversing a direction of the first pointer and traversing the distributed register one block at a time with the first pointer; locating the parent block within the distributed register based on identifying a convergence of the first pointer and the second pointer; and executing a linear search on each of one or more paths within the hash stack, wherein each linear search terminates at the parent block.

In some embodiments, the hash stack further comprises a hash of a third valid block.

In some embodiments, the third valid block is appended to a fourth valid block, wherein the fourth valid block is appended to the parent block.

In some embodiments, the first valid block comprises a first set of block data, wherein the second valid block comprises a second set of block data.

In some embodiments, the distributed register is based on a proof-of-work consensus algorithm, wherein the first valid block and the second valid block each comprise a valid solution to a cryptographic challenge as defined by the proof-of-work consensus algorithm.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
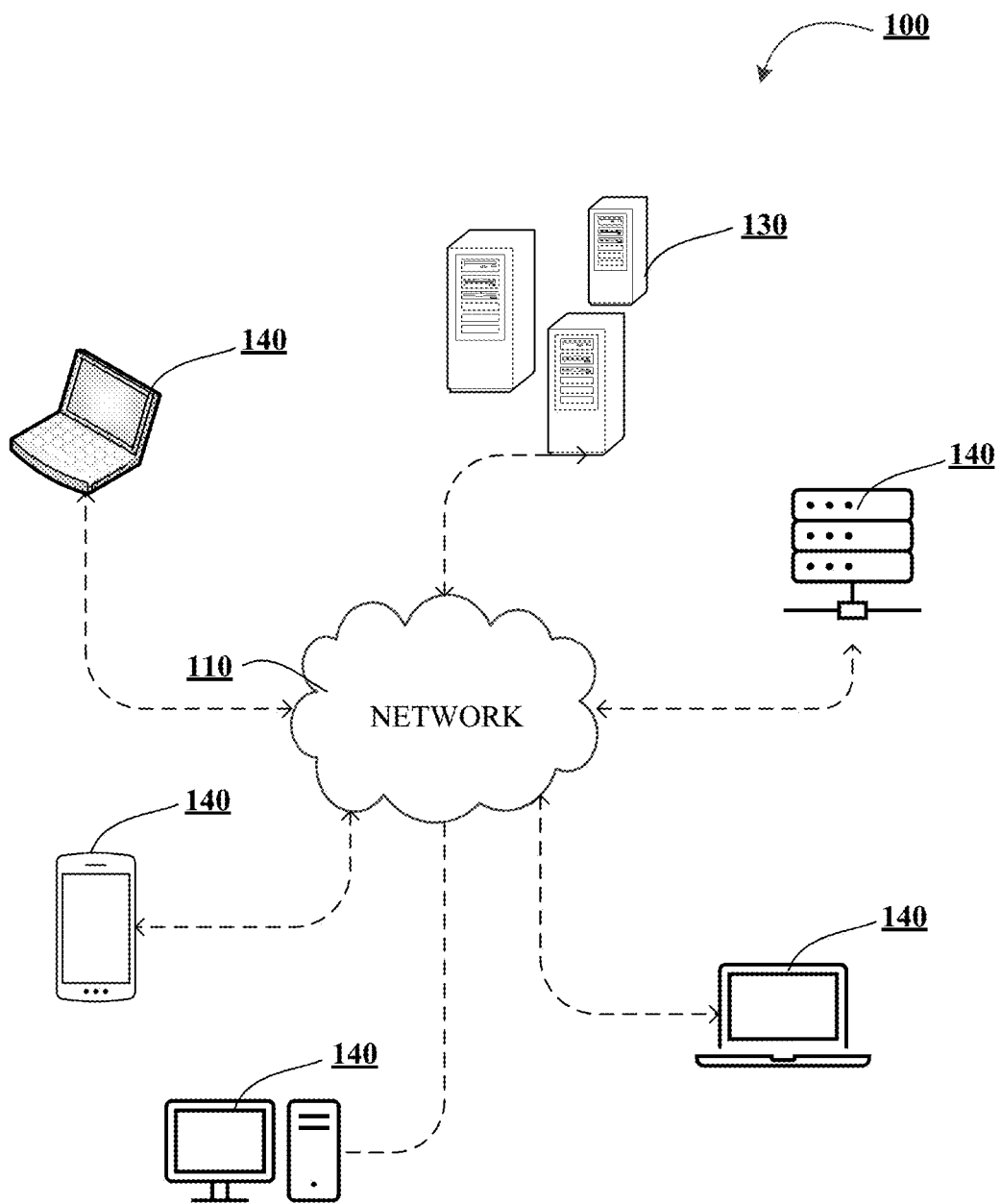
Figure 1B:
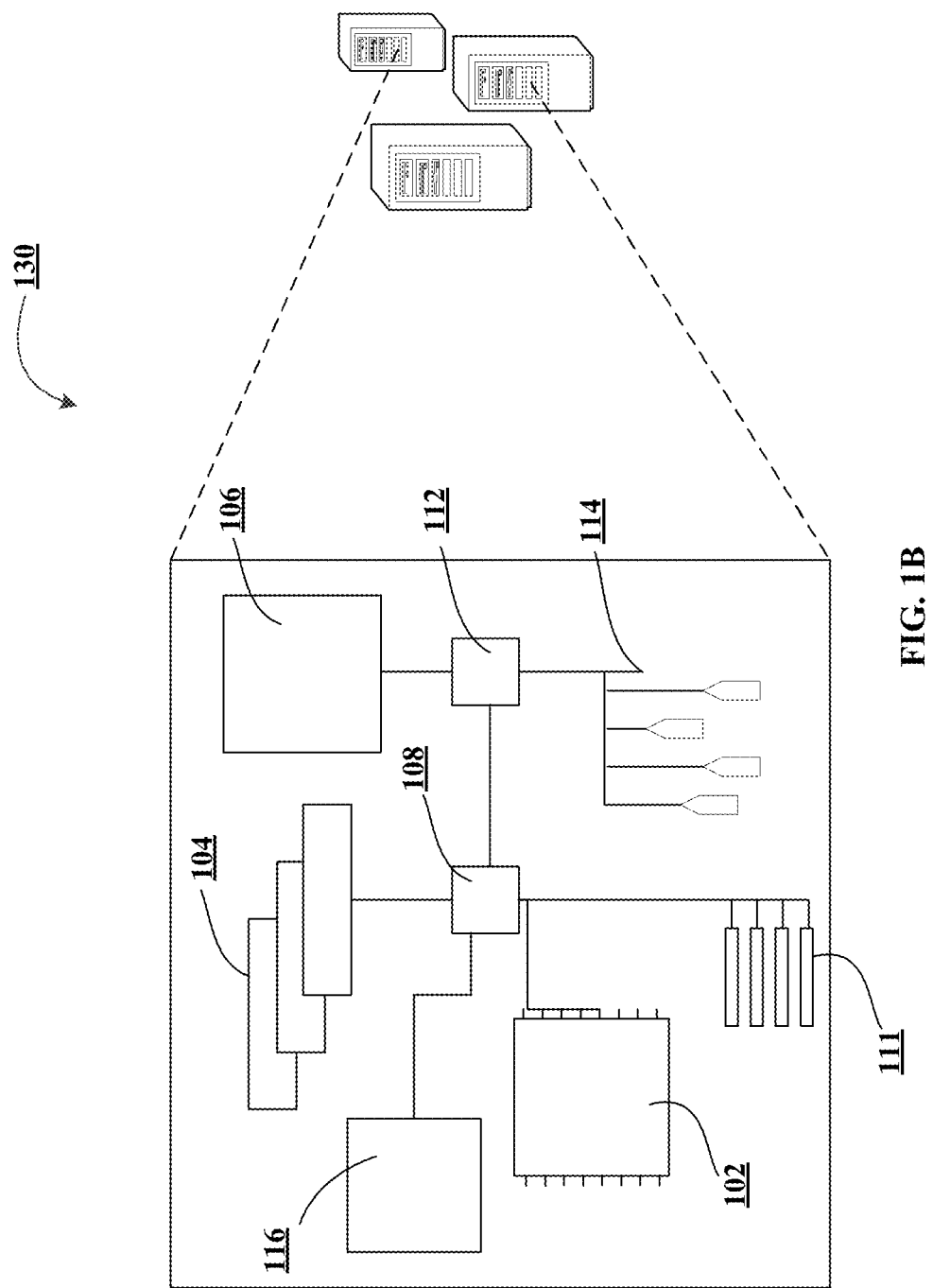
Figure 1C:
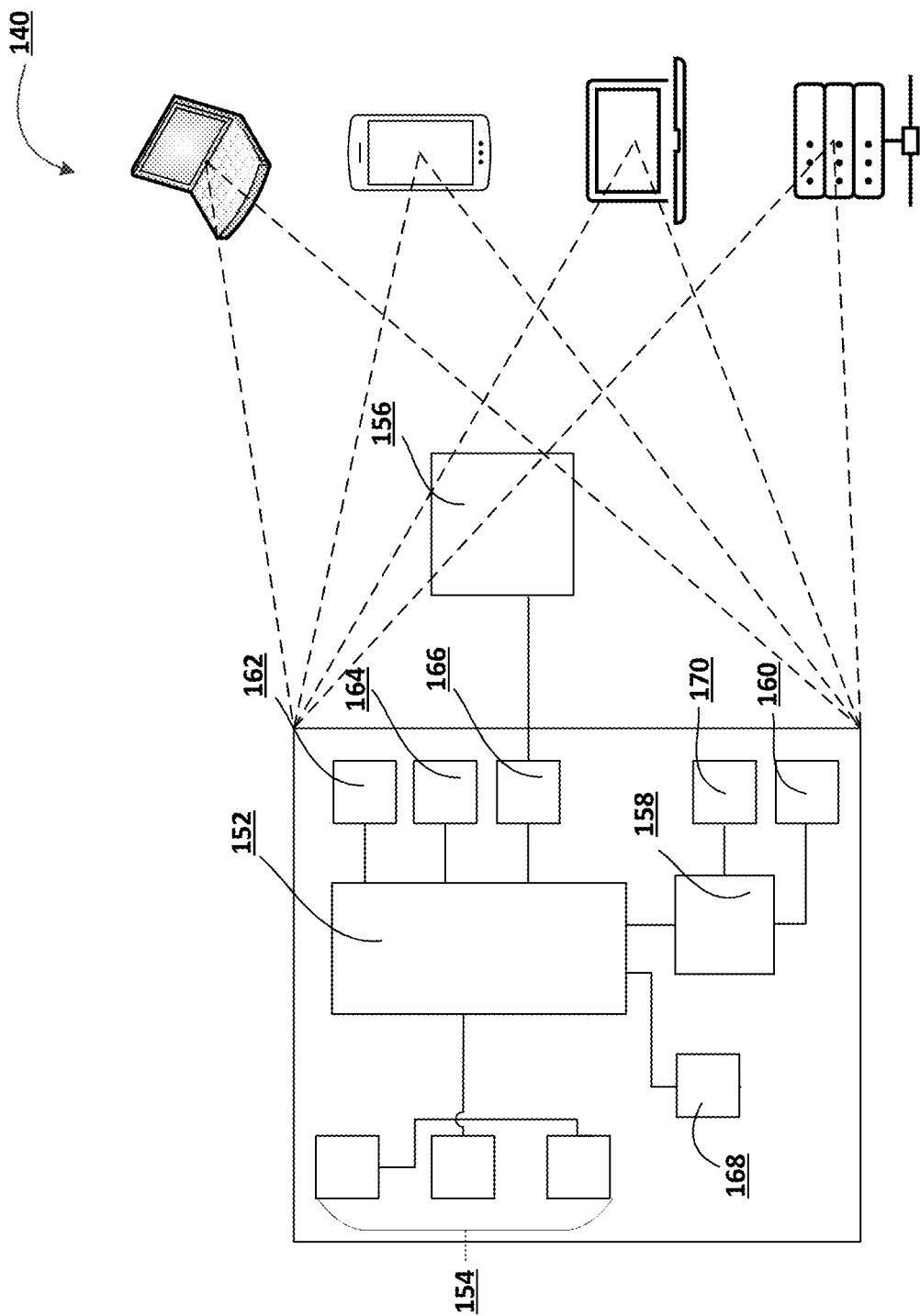
Figure 2A:
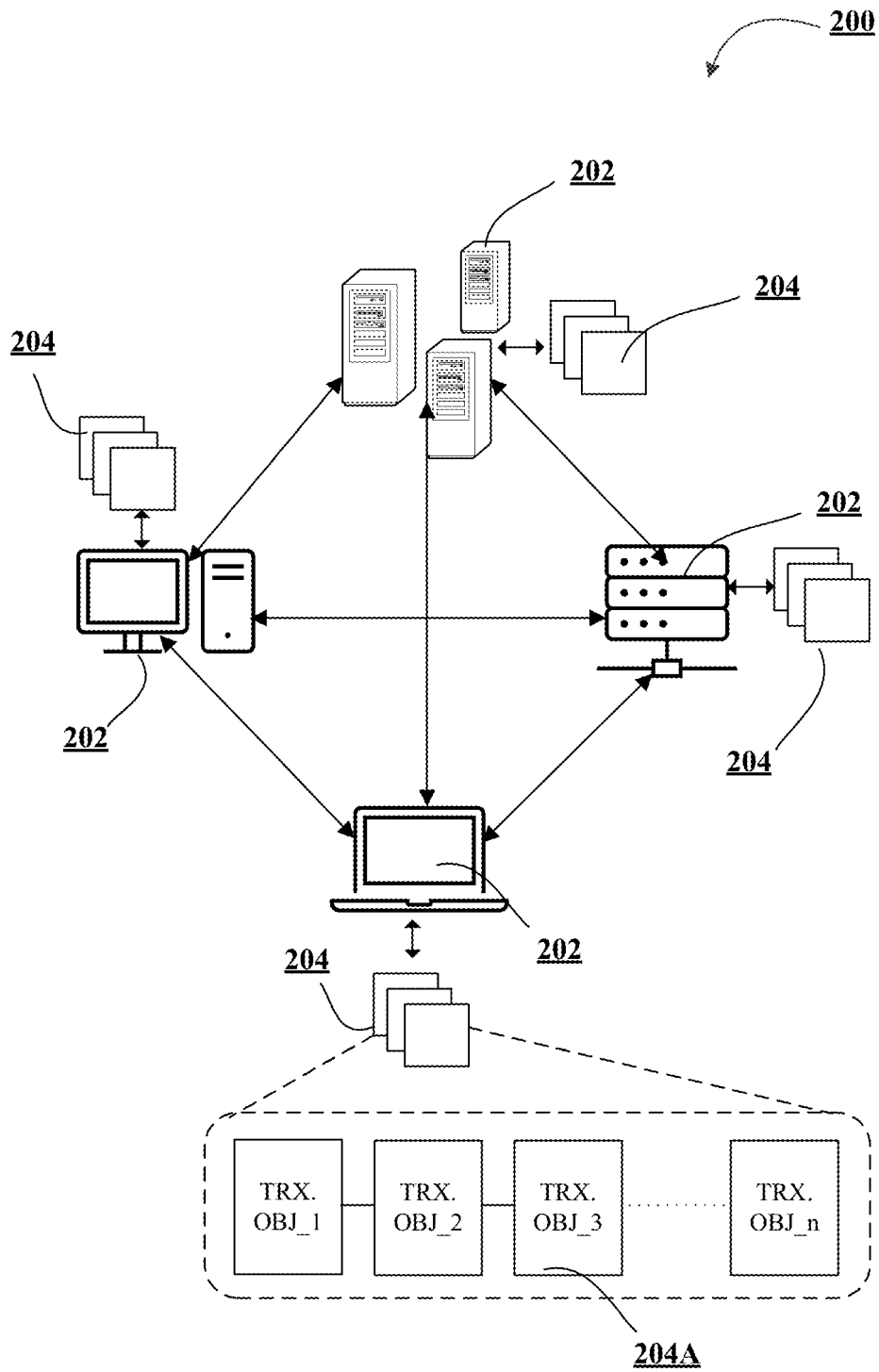
Figure 2B:
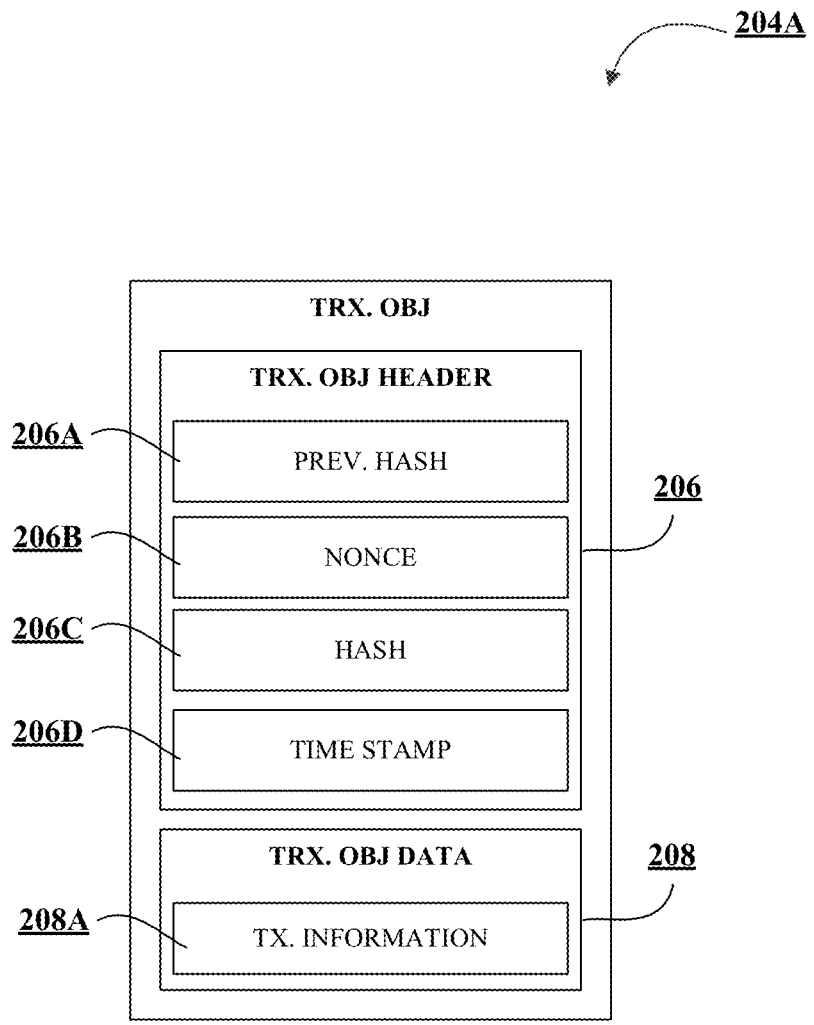
Figure 3A:
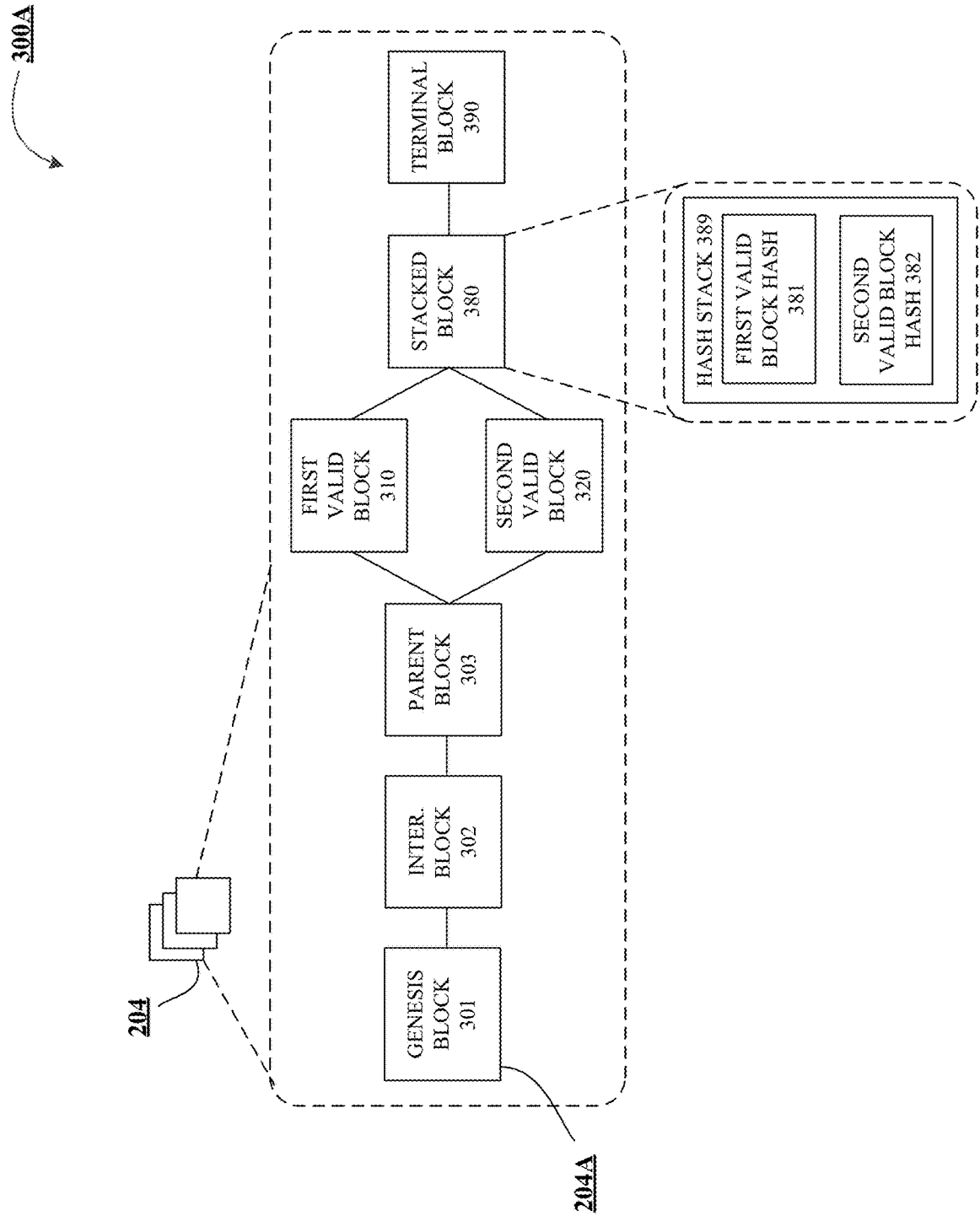
Figure 3B:
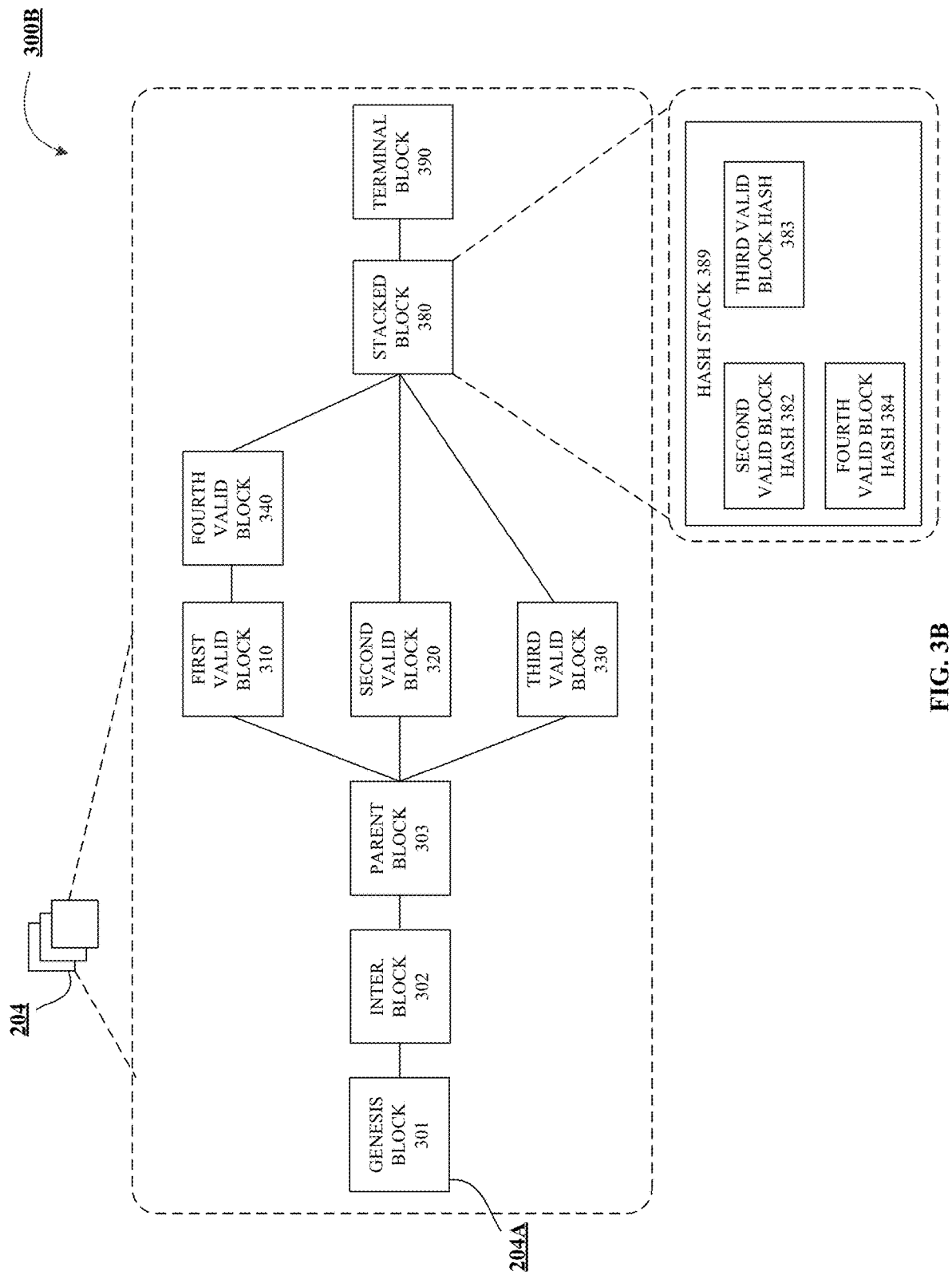
Figure 4:
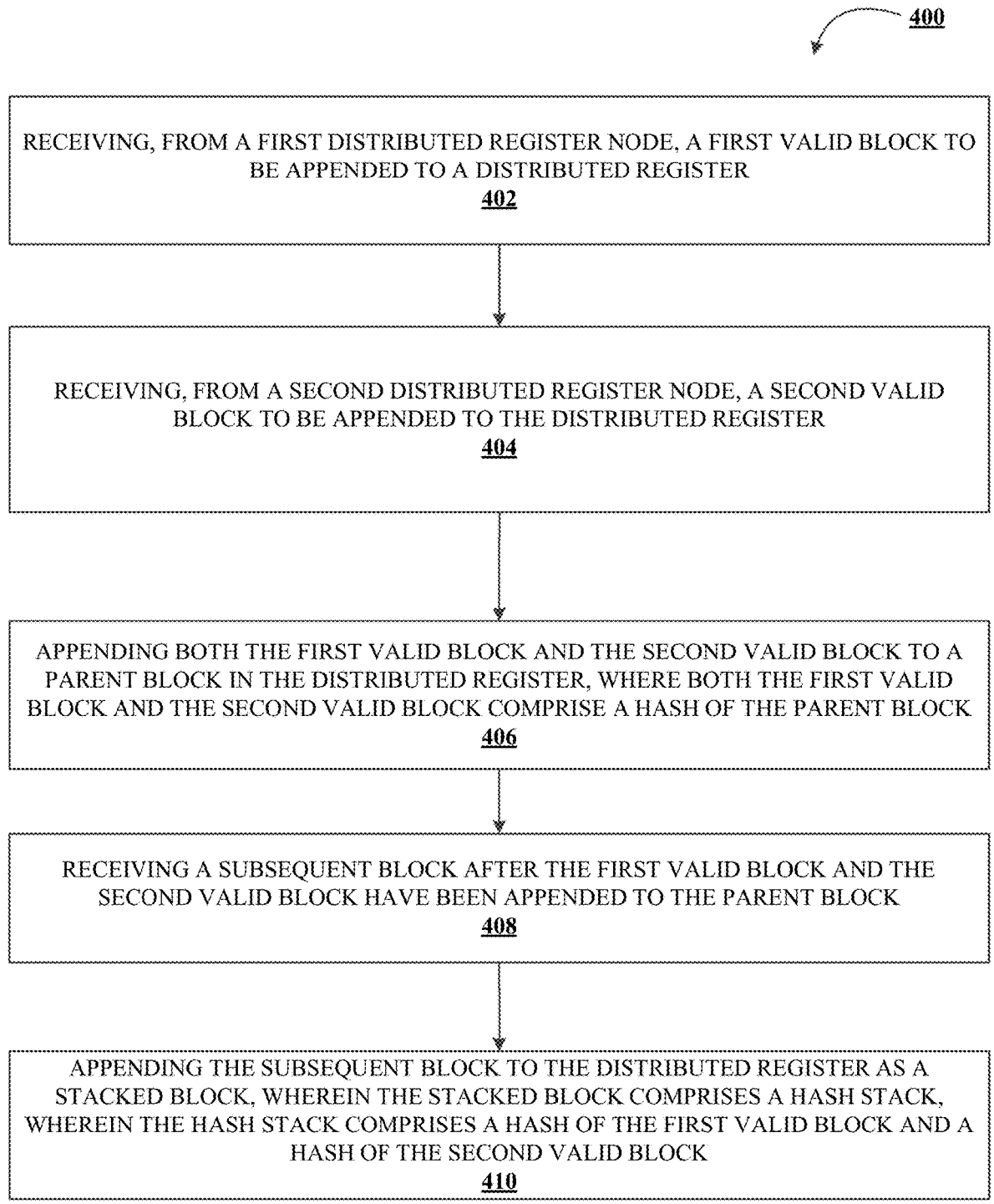
Figure 5:
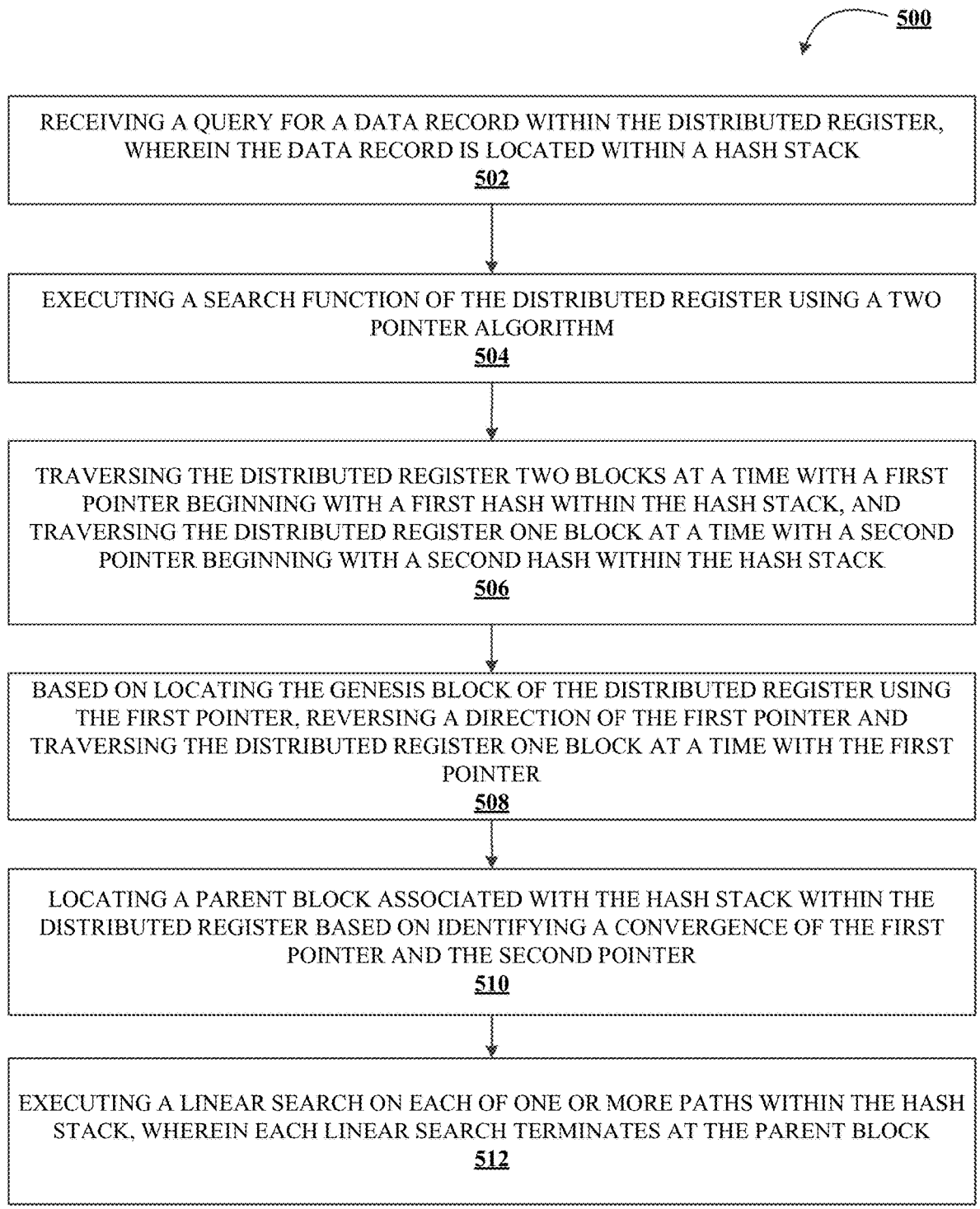

FIGS. 1A-1C illustrates technical components of an exemplary distributed computing environment for intelligent and integrated preservation of multiple electronic data records within a distributed electronic data register, in accordance with an embodiment of the disclosure;

FIG. 2A illustrates an exemplary DLT architecture, in accordance with an embodiment of the disclosure;

FIG. 2B illustrates an exemplary transaction object within the DLT architecture, in accordance with an embodiment of the disclosure;

FIG. 3A illustrates an exemplary DLT architecture comprising a first multi-linked data structure, in accordance with an embodiment of the disclosure;

FIG. 3B illustrates an exemplary DLT architecture comprising a second multi-linked data structure, in accordance with an embodiment of the disclosure;

FIG. 4 illustrates a method for intelligent and integrated preservation of multiple electronic data records within a distributed electronic data register, in accordance with an embodiment of the disclosure;

FIG. 5 illustrates a method for locating a data record within the distributed electronic data register using a two pointer algorithm, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, investment vehicles, cryptographic and/or digital currencies, and/or the like. In yet other embodiments, the resources may include real-world goods or commodities that may be acquired and/or exchanged by a user.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

Distributed registers (which may in some embodiments be blockchain ledgers) provide entities with a durable, decentralized platform on which to store data. In particular, the decentralized, consensus-based manner in which data is stored in the distributed register provides a degree of resistance to tampering of the data stored therein. Furthermore, the use of smart contracts may streamline and expedite the interactions between entities. That said, certain implementations of distributed registers may include inefficiencies in its data storage processes. For instance, in some cases, a distributed ledger technology ("DLT") network may use miner nodes that compete with one another to compute a solution to a cryptographic puzzle. In such cases, the miner that first computes the solution and propagates its local version of the blockchain ledger to the other nodes in the DLT network (e.g., due to higher computing power, faster network connections, and/or the like) will add its mined block to the end of the blockchain ledger. Subsequent mined blocks by other miners, even if they may contain a valid solution, are discarded, such that the computing resources, time, and energy expended by a miner in generating the subsequent mined block may be wasted. Accordingly, there is a need for a more efficient way to add blocks or data records to the distributed register.

To address the above concerns among others, the system described herein provides a distributed register with a multi-linked data architecture. In particular, the distributed register may be a blockchain ledger comprising a plurality of blocks or data records, where each block comprises block data (which may comprise one or more transactions) and metadata, where the metadata comprises at least one link or reference to at least one previous block in the blockchain ledger. The link or reference may be, for instance, a hash value generated by inputting the data of the previous block into a hash algorithm (e.g., Secure Hash Algorithm, or the like). In some embodiments, the system may use a consensus algorithm that requires a miner node to compute a solution to a cryptographic puzzle to select the next block in the blockchain ledger. In some cases, multiple miner nodes may compute a valid solution, and thus the system may receive multiple blocks from the miner nodes to be added to the blockchain. In such a scenario, rather than accepting a single valid block and discarding the remainder, the current last or terminal block of the blockchain may serve as a "parent block" or "root block" to which each of the multiple valid blocks may refer (e.g., by containing a hash of the parent block).

For example, miner node A may submit a first proposed block containing a first transaction, and miner node B may submit a second proposed block containing a second transaction. In this example, both the first valid block and the second valid block may be appended to the parent block (e.g., the current terminal block in the blockchain) such that both the first proposed block and second proposed block each contain the hash of the parent block. In some embodiments, addition blocks mined by miner node A or miner node B may be appended to their respective ends of the chain (e.g., a third proposed block submitted by miner node A may be appended to the first proposed block submitted by miner node A, which is appended to the parent block). It should further be appreciated that additional proposed blocks may be submitted by other miner nodes at the same time, such that more than two proposed blocks are appended to the parent block (e.g., proposed blocks submitted by miner node C, miner node D, and the like).

Subsequently, the system (e.g., the nodes) may recognize the existence or presence of two versions or instances of the blockchain ledger (e.g., a first version containing the first proposed block submitted by miner node A as the terminal block, and a second version containing the second proposed block submitted by miner node B as the terminal block). In such embodiments, the next block that is appended to the blockchain ledger may comprise a "stack" or "hashmap" in the block metadata, where the stack may comprise multiple hashes of the previous blocks in the chain. Such a block may be referred to herein as a "stacked block." Continuing the above example, the stack within the stacked block may comprise both a hash of the first proposed block submitted by miner node A (e.g., a "first" or "top" hash within the stack) and a hash of the second proposed block submitted by miner node B (e.g., a "second" hash within the stack). In this way, at the time the stacked block is appended to the blockchain ledger, the stacked block comprises a link or reference to all of the terminal blocks in the chain (e.g., the first proposed block and the second proposed block). Subsequent to the stacked block being added to the blockchain ledger, additional blocks may be appended to the stacked block in any of the manners described herein. In this way, the system may preserve multiple valid data records within the blockchain ledger while preserving a single version of the blockchain ledger (e.g., preventing forking).

The system may receive a query for a particular transaction or data record within the distributed register. Further, the query may be for a data record that is stored within a block that is linked (directly or indirectly) by a particular stack or hashmap. In such an embodiment, the system may first, in response to receiving the query, use a two-pointer algorithm to identify the parent block. The two-pointer algorithm may include a first pointer beginning with the first or top hash in the stack and a second pointer beginning with the second hash in the stack. The first pointer may traverse the distributed register two blocks at a time, while the second pointer may traverse the distributed register one block at a time, until the first pointer reaches the genesis block. It should be understood that in other embodiments, the second pointer may be the one that traverses two blocks at a time while the first pointer may be the one that traverses one block at a time.

Once the first pointer reaches the genesis block, the first pointer may reverse direction and traverse the distributed register one block at a time, whereas the second pointer may then begin traversing the distributed register two blocks at a time. When the first pointer and second pointer converge on the same block, the system may determine that the parent block (e.g., the block to which multiple blocks may be linked) has been found using the two pointer algorithm. Subsequently, the system may perform a linear search along each of the paths of each of the hashes within the stack, where each path terminates at the parent block identified using the two pointer algorithm. By limiting the parameters of linear search to the parent block, the system may increase the computing efficiency of the search by saving the computing resources that would have been expended in unnecessarily searching beyond the parent block all the way to the genesis block along each of the paths defined by the various hashes in the stack.

An exemplary embodiment is provided as follows for illustrative purposes only and should not be construed as limiting the scope of the disclosure provided herein. In one embodiment, a first miner may submit a first block to be validated that contains first transaction and fourth transaction, and a second miner may submit a second block that contains a second transaction and third transaction (e.g., the first block and second block contain different transactions). The local distributed register of the first miner (e.g., a blockchain with the first block as the latest block) may be accepted by the remaining nodes first (e.g., because the first miner has superior computing power, faster network transfer speed, lower latency, and/or the like). In this way, the first block may be added to the parent block (e.g., the prior terminal block in the blockchain). Rather than discarding the second block, the system may allow the second block to be added to the parent block such that both the first block and second block are linked to the parent block. Subsequently, a stacked block may be added that may reference both the hash of the first block and the hash of the second block. In this way, the distributed register maintains a substantially linear data structure while preserving the data or transactions that would have otherwise been lost in conventional systems.

The system as described herein provides a number of technological benefits over conventional DLT systems. In particular, by allowing multiple blocks to reference the hash of a parent block, the system may prevent the waste of computing resources associated with otherwise valid blocks submitted after the first valid block that is accepted by the majority of the nodes. Furthermore, by using a two pointer search algorithm as described herein, the system may increase the efficiency of searches within the distributed register by preventing unnecessary searches beyond the parent block.

FIGS. 1A-1C illustrate technical components of an exemplary distributed computing environment 100 for the system for intelligent and integrated preservation of multiple electronic data records within a distributed electronic data register, in accordance with one embodiment of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, i interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT may use a peer-to-peer protocol for a cryptographically secured distributed ledger of transactions represented as transaction objects (which may also be referred to herein as "data records" or "blocks") that are linked. In some embodiments, the transaction objects or data records may contain state information about a resource that is tracked by the system. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT may use smart contracts. "Smart contracts" as used herein may refer to computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A "public distributed ledger" as referred to herein may refer to a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, a fully private distributed ledger may be a distributed ledger whereby permissions are kept centralized with one entity. The permissions may be public or restricted to an arbitrary extent. And lastly, a consortium distributed ledger may be a distributed ledger where the consensus process is controlled by a pre-selected set of nodes; for example, a distributed ledger may be associated with a number of member institutions (e.g., 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 (which may also be referred to herein as the "distributed register") or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes. The transaction objects 204A may comprise an origin transaction object that may serve as the beginning of a chain of transaction objects, such that transaction objects 204A are added to the end of the chain beginning from the origin transaction object.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3A illustrates an exemplary DLT architecture comprising a first multi-linked data structure 300A, in accordance with an embodiment of the disclosure. The architecture may include a DLT ledger 204 comprising one or more transaction objects 204A (which may also be referred to herein as "blocks"). The DLT ledger 204 may include a genesis block 301 which may serve as the first block within the blockchain data structure of the DLT ledger 204. One or more intermediate blocks 302 may be appended to the DLT ledger 204 in the manner described above. In this regard, a first intermediate block may comprise a hash of the genesis block 301, thereby linking the first intermediate block to the genesis block 301, and a second intermediate block may comprise a hash of the first intermediate block, thereby linking the second intermediate block to the first intermediate block, and the like.

In one scenario, the system may detect that multiple blocks have been submitted by multiple nodes, where each of the multiple blocks were generated using a valid solution to the cryptographic puzzle or challenge posed by the DLT system (there are multiple "valid" blocks). At such a point in time, the terminal block within the DLT ledger 204 may be referred to as a parent block 303. In one embodiment, the system may detect a first valid block 310 (e.g., a block submitted by a first miner) and a second valid block 320 (e.g., a block submitted by a second miner). Rather than accepting only a single block to be appended to the DLT ledger 204 (e.g., the first valid block 310), the system may allow multiple valid blocks (e.g., the first valid block 310 and the second valid block 320) to be appended to the parent block 303. In such a scenario, both the first valid block 310 and the second valid block 320 may each comprise a hash of the parent block 303 such that both the first valid block 310 and the second valid block 320 are linked to the parent block 303. At this stage, the DLT ledger 204 may temporarily have multiple terminal blocks (e.g., the first valid block 310 and the second valid block 320).

Subsequently, the system may receive a request from a node to add another block to the DLT ledger 204 after the first valid block 310 and second valid block 320 have been appended to the parent block 303. In such a scenario, the additional block may be added to the DLT ledger 204 as a stacked block 380, where the stacked block 380 may be linked to multiple blocks in the DLT ledger 204 (e.g., the stacked block 380 may be linked to both the first valid block 310 and the second valid block 320). Accordingly, the stacked block 380 may comprise a hash stack 389 that may comprise the hash values of each of the multiple blocks to which the stacked block 380 is linked. Additional blocks may be appended to the stacked block 380 in a linear manner, or a multi-layered manner, or any combination thereof as described above. The DLT ledger 204 may end in a terminal block 390, which is shown in FIG. 3A as being appended to the stacked block 380.

FIG. 3B illustrates an exemplary DLT architecture comprising a second multi-linked data structure 300B, in accordance with an embodiment of the disclosure. Similar to the DLT ledger 204 shown in FIG. 3A, the DLT ledger 204 shown in FIG. 3B may comprise a genesis block 301, one or more intermediate blocks 302, and a parent block 303. Subsequently, the system may receive multiple valid blocks to be appended to the DLT ledger 204. For instance, the system may receive a first valid block 310 from a first DLT node, then a second valid block 320 from a second DLT node, and a third valid block 330 from a third DLT node. In such an embodiment, all three blocks (the first valid block 310, the second valid block 320, and the third valid block 330) may be appended to the parent block 303. In this regard, the three blocks 310, 320, 330 may each comprise a hash of the parent block 303, thereby creating multiple layers within the DLT ledger 204.

In some embodiments, one or more blocks may be added to one of the individual layers created in the multi-layer stack. For instance, in one embodiment, a fourth valid block 340 may be appended to the first valid block 310, but not to the other blocks (e.g., the second valid block 320 and/or the third valid block 330). In such a scenario, the terminal blocks of the DLT ledger 204 may be the second valid block 320, the third valid block 330, and the fourth valid block 340.

Subsequently, the system may receive a request to add another block to the DLT ledger 204 (e.g., the stacked block 380). The stacked block 380 may be appended to each of the terminal blocks of the DLT ledger 204 at the time the stacked block 380 is added (e.g., the second valid block 320, the third valid block 330, and the fourth valid block 340). Accordingly, the hash stack 389 of the stacked block 380 may comprise a second valid block hash 382 of the second valid block 320, a third valid block hash 383 of the third valid block 330, and a fourth valid block hash 384 of the fourth valid block 340.

It should be appreciated that numerous other variations of DLT ledgers may exist within the scope of the disclosure provided herein. For instance, though a single stacked block and single parent block are shown in FIGS. 3A and 3B, it should be understood that the DLT ledger 204 may comprise multiple instances in which a plurality of blocks are appended to a parent block and subsequently linked to a stacked block in the manner described above.

FIG. 4 illustrates a method 400 for intelligent and integrated preservation of multiple electronic data records within a distributed electronic data register, in accordance with an embodiment of the disclosure. As seen in block 402, the method includes receiving, from a first distributed register node, a first valid block to be appended to a distributed register. The first valid block may be, for instance, a block that may contain a first set of transaction data or block data and may be submitted by a first DLT node that complies with the requirements for a block to be added to the distributed register. For instance, in a DLT ledger with a proof-of-work consensus algorithm, the first valid block may include a valid solution to the cryptographic puzzle or challenge posed by the DLT system.

Next, as seen in block 404, the method includes receiving, from a second distributed register node, a second valid block to be appended to the distributed register. The second valid block may be, for instance, a block that may contain a second set of transaction data or block data and may be submitted by a second DLT node that also, like the first valid block, complies with the requirements to be added to the distributed register, but is received by the system after the first valid block. Continuing the example, if the DLT system uses a proof-of-work consensus algorithm, the second valid block may also contain a valid solution to the cryptographic challenge posed by the DLT system.

It should be understood that while reference may be made to a first block being "appended" to a second block, it is not necessarily the case that the first block is directly appended to the second block with no intermediaries. Indeed, the first block may be considered appended to the second block in the scenario that the first block is appended to a third block, which is appended to a fourth block, which is appended to the second block, and/or the like (e.g., the first block is "indirectly" appended to the second block).

Next, as seen in block 406, the method includes appending both the first valid block and the second valid block to a parent block in the distributed register, where both the first valid block and the second valid block comprise a hash of the parent block. Rather than discarding the second valid block, thereby losing the opportunity to add the second set of block data to the DLT ledger, the system may wait in order to add both the first valid block and the second valid block to the distributed register by appending both blocks to the terminal block of the DLT ledger. In such a configuration, the terminal block may be referred to as the "parent block." In this way, multiple different paths or instances of the DLT ledger may be created (e.g., one pathway or instance that includes the first valid block, and another pathway or instance that includes the second valid block).

Next, as seen in block 408, the method includes receiving a subsequent block after the first valid block and the second valid block have been appended to the parent block. The subsequent block may be received when the state of the distributed register includes an open-ended configuration that includes multiple pathways or instances. For instance, the DLT ledger may include a pathway in which the first valid block is the terminal block, and another in which the second valid block is the terminal block.

Next, as seen in block 410, the method includes appending the subsequent block to the distributed register as a stacked block, wherein the stacked block comprises a hash stack, wherein the hash stack comprises a hash of the first valid block and a hash of the second valid block. In such a configuration, the subsequent block (or "stacked block") may be linked to each of the terminal blocks of the various pathways or instances of the DLT ledger (e.g., the first valid block and the second valid block). By adding the stacked block to the distributed register in this way, the system may preserve all of the data within all of the different pathways of the distributed register while helping to prevent loss of consensus (e.g., forking) of the distributed register.

FIG. 5 illustrates a method 500 for locating a data record within the distributed electronic data register using a two pointer algorithm, in accordance with an embodiment of the disclosure. As seen in block 502, the method includes receiving a query for a data record within the distributed register, wherein the data record is located within a hash stack. For instance, referring back to FIG. 3B, the data record to be located may be stored within the third valid block 330. Accordingly, the system may use a two pointer algorithm to quickly and efficiently locate the data record within the third valid block.

Next, as seen in block 504, the method includes executing a search function of the distributed register using a two pointer algorithm. Referring once more to FIG. 3B, the search function may include locating the parent block 303 that precedes the desired data record was added, and subsequently locating the desired data record based on the location of the parent block 303. Accordingly, the search function may include the steps as described below in further detail.

Next, as seen in block 506, executing the search function may include traversing the distributed register two blocks at a time with a first pointer beginning with a first hash within the hash stack, and traversing the distributed register one block at a time with a second pointer beginning with a second hash within the hash stack. Continuing the example, the first pointer may traverse the path that includes the first valid block 310, and the second pointer may traverse the path that includes the second valid block 320. In one embodiment, the first pointer may traverse the path two blocks at a time, whereas the second pointer may traverse the path one block at a time, where the system may be configured to track the hashes of the blocks discovered by each of the pointers. The system may continue the search in this manner until one of the pointers (e.g., first pointer) reaches the genesis block 301.

Next, as seen in block 508, executing the search function may further include, based on locating the genesis block of the distributed register using the first pointer, reversing a direction of the first pointer and traversing the distributed register one block at a time with the first pointer and traversing the distributed register two blocks at a time with the second pointer. Once the genesis block is reached, the first pointer may reverse its direction and traverse the blocks one at a time, whereas the second pointer may begin to traverse the blocks two at a time. In this way, the system may quickly and efficiently locate the parent block associated with the desired data record.

Next, as seen in block 510, executing the search function may further include locating a parent block associated with the hash stack within the distributed register based on identifying a convergence point within the distributed register. Based on tracking the hashes detected from both of the pointers, the system may be able to identify the last block before the temporary divergence of the DLT ledger path into the separate pathways (e.g., the individual pathways defined by the first valid block 310 and the second valid block 320). The last block may be considered by the system to be the parent block 303. Once the parent block 303 is identified, the system may complete the search of the remaining pathways within the hash stack.

Next, as seen in block 512, executing the search function may further include executing a linear search on each of one or more paths within the hash stack, wherein each linear search terminates at the parent block. Continuing the example, the system may traverse the various pathways one block at a time until the desired data record is located. Each of the linear searches may terminate at the parent block 303 such that the blocks prior to the parent block 303 (e.g., the genesis block 301 and the one or more intermediate blocks 302) are not searched by the system. By searching through the pathways one at a time, the system may eventually locate the requested data record within the third valid block 330.

The two pointer method described herein may save significant computing resources in providing search results in response to queries for data records, and such efficiency gains may compound as the distributed register becomes increasingly complex. For instance, in the scenario in which the desired data record is located within the twentieth pathway, and there are hundreds or thousands of intermediate blocks that precede the parent block 303, terminating the linear searches at the parent block 303 may be substantially more efficient than conventional search methods by preventing computing resources from being expended by redundant searches of blocks.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for searching electronic data records within a distributed electronic data register, the system comprising:
   a processing device; and
   a non-transitory storage device containing instructions configured such that when executed by the processing device, causes the processing device to perform the steps of:
   receiving a query for a data record within the distributed electronic data register;
   accessing the distributed electronic data register where the distributed electronic data register comprises a first valid block and a second valid block appended to a parent block in the distributed electronic data register, where both the first valid block and the second valid block each comprise a hash of the parent block, wherein a subsequent block is appended to the distributed electronic data register as a stacked block, wherein the stacked block comprises a hash stack, wherein the hash stack comprises a hash of the first valid block and a hash of the second valid block; and
   executing a search function of the distributed electronic data register using a two pointer algorithm, wherein executing the search function comprises:
   traversing the distributed electronic data register two blocks at a time with a first pointer beginning with a first hash within the hash stack, and traversing the distributed electronic data register one block at a time with a second pointer beginning with a second hash within the hash stack;
   based on locating a genesis block of the distributed electronic data register using the first pointer, reversing a direction of the first pointer and traversing the distributed electronic data register one block at a time with the first pointer;
   locating the parent block within the distributed electronic data register based on identifying a convergence of the first pointer and the second pointer; and
   executing a linear search on each of one or more paths within the hash stack, wherein each linear search terminates at the parent block.

2. The system of claim 1, wherein the first hash in the stack is a top hash in the stack.

3. The system of claim 1, wherein when the first pointer reaches the genesis block, reversing the direction of the first pointer and traversing the distributed electronic data register one block at a time with the first pointer, and traversing the distributed electronic data register two blocks at a time with the second pointer.

4. The system of claim 1, wherein the hash stack further comprises a hash of a third valid block.

5. The system of claim 4, wherein the third valid block is appended to a fourth valid block, wherein the fourth valid block is appended to the parent block.

6. The system of claim 1, wherein the first valid block comprises a first set of block data, wherein the second valid block comprises a second set of block data.

7. The system of claim 1, wherein the distributed electronic data register is based on a proof-of-work consensus algorithm, wherein the first valid block and the second valid block each comprise a valid solution to a cryptographic challenge as defined by the proof-of-work consensus algorithm.

8. A computer program product for searching multiple electronic data records within a distributed electronic data register, wherein the distributed electronic data register comprises a first valid block and a second valid block appended to a parent block in the distributed electronic data register, where both the first valid block and the second valid block each comprise a hash of the parent block, wherein a subsequent block is appended to the distributed electronic data register as a stacked block, wherein the stacked block comprises a hash stack, wherein the hash stack comprises a hash of the first valid block and a hash of the second valid block, the computer program product comprising a non-transitory computer-readable medium comprising code causing an apparatus to perform the steps of:

receiving a query for a data record within the distributed electronic data register;
 accessing the distributed electronic data register; and
 executing a search function of the distributed electronic data register using a two pointer algorithm, wherein executing the search function comprises:
  traversing the distributed electronic data register two blocks at a time with a first pointer beginning with a first hash within the hash stack, and traversing the distributed electronic data register one block at a time with a second pointer beginning with a second hash within the hash stack;
  based on locating a genesis block of the distributed electronic data register using the first pointer, reversing a direction of the first pointer and traversing the distributed electronic data register one block at a time with the first pointer;
  locating the parent block within the distributed electronic data register based on identifying a convergence of the first pointer and the second pointer; and
  executing a linear search on each of one or more paths within the hash stack, wherein each linear search terminates at the parent block.

9. The computer program product of claim 8, wherein the first hash in the stack is a top hash in the stack.

10. The computer program product of claim 8, wherein when the first pointer reaches the genesis block, reversing the direction of the first pointer and traversing the distributed electronic data register one block at a time with the first pointer, and traversing the distributed electronic data register two blocks at a time with the second pointer.

11. The computer program product of claim 8, wherein the hash stack further comprises a hash of a third valid block.

12. The computer program product of claim 11, wherein the third valid block is appended to a fourth valid block, wherein the fourth valid block is appended to the parent block.

13. The computer program product of claim 8, wherein the first valid block comprises a first set of block data, wherein the second valid block comprises a second set of block data.

14. The computer program product of claim 8, wherein the distributed electronic data register is based on a proof-of-work consensus algorithm, wherein the first valid block and the second valid block each comprise a valid solution to a cryptographic challenge as defined by the proof-of-work consensus algorithm.

15. A computer-implemented method for searching multiple electronic data records within a distributed electronic data register, wherein the distributed electronic data register comprises a first valid block and a second valid block appended to a parent block in the distributed electronic data register, where both the first valid block and the second valid block each comprise a hash of the parent block, wherein a subsequent block is appended to the distributed electronic data register as a stacked block, wherein the stacked block comprises a hash stack, wherein the hash stack comprises a hash of the first valid block and a hash of the second valid block, the method comprising:

receiving a query for a data record within the distributed electronic data register;
 accessing the distributed electronic data register; and
 executing a search function of the distributed electronic data register using a two pointer algorithm, wherein executing the search function comprises:
  traversing the distributed electronic data register two blocks at a time with a first pointer beginning with a first hash within the hash stack, and traversing the distributed electronic data register one block at a time with a second pointer beginning with a second hash within the hash stack;
  based on locating a genesis block of the distributed electronic data register using the first pointer, reversing a direction of the first pointer and traversing the distributed electronic data register one block at a time with the first pointer;
  locating the parent block within the distributed electronic data register based on identifying a convergence of the first pointer and the second pointer; and
 executing a linear search on each of one or more paths within the hash stack, wherein each linear search terminates at the parent block.

16. The computer-implemented method of claim 15, wherein the first hash in the stack is a top hash in the stack.

17. The computer-implemented method of claim 15, wherein when the first pointer reaches the genesis block, reversing the direction of the first pointer and traversing the distributed electronic data register one block at a time with the first pointer, and traversing the distributed electronic data register two blocks at a time with the second pointer.

18. The computer-implemented method of claim 15, wherein the hash stack further comprises a hash of a third valid block.

19. The computer-implemented method of claim 18, wherein the third valid block is appended to a fourth valid block, wherein the fourth valid block is appended to the parent block.

20. The computer-implemented method of claim 15, wherein the first valid block comprises a first set of block data, wherein the second valid block comprises a second set of block data.

\* \* \* \* \*